(12) United States Patent
Eidam et al.

(10) Patent No.: US 12,276,264 B2
(45) Date of Patent: Apr. 15, 2025

(54) CABLE GUIDING STRUCTURE FOR A TOWER FOR A WIND TURBINE, METHOD FOR MOUNTING A CABLE GUIDING STRUCTURE, AND WIND TURBINE

(71) Applicant: General Electric Renovables Espana, S.L., Barcelona (ES)

(72) Inventors: Mathias Eidam, Salzbergen (DE); Holger Luehn, Salzbergen (DE); Daniel Ross, Salzbergen (DE); Eduardo Moreno, Barcelona (ES)

(73) Assignee: General Electric Renovables España S.L., Barcelona (ES)

( * ) Notice: Subject to any disclaimer, the term of this patent is extended or adjusted under 35 U.S.C. 154(b) by 159 days.

(21) Appl. No.: 17/864,616

(22) Filed: Jul. 14, 2022

(65) Prior Publication Data

US 2023/0019033 A1 Jan. 19, 2023

(30) Foreign Application Priority Data

Jul. 15, 2021 (EP) .................................... 21382638

(51) Int. Cl.
*F03D 80/80* (2016.01)
*F16L 3/015* (2006.01)
*H02G 3/04* (2006.01)

(52) U.S. Cl.
CPC .............. *F03D 80/85* (2016.05); *F16L 3/015* (2013.01); *H02G 3/0456* (2013.01)

(58) Field of Classification Search
CPC .......... H02G 3/02; H02G 3/04; H02G 3/0406; H02G 3/0437; H02G 3/0456; F03D 80/85; F16L 3/015
See application file for complete search history.

(56) References Cited

U.S. PATENT DOCUMENTS

| 8,274,170 B2 | 9/2012 | Kassner |
| 8,366,396 B2 * | 2/2013 | Barton ..................... H02G 3/32 416/DIG. 6 |

(Continued)

FOREIGN PATENT DOCUMENTS

| CN | 208971070 U | 6/2019 |
| CN | 111682469 A | 9/2020 |

(Continued)

OTHER PUBLICATIONS

European Search Report Corresponding to EP21382638 on Jan. 7, 2022.

*Primary Examiner* — Eret C McNichols
(74) *Attorney, Agent, or Firm* — Dority & Manning, P.A.

(57) ABSTRACT

A cable guiding structure (200) for a tower (108) of a wind turbine (10) is described. The tower has a height in substantially vertical direction (110) and a width in substantially horizontal direction (112). The cable guiding structure (200) is adapted for guiding a cable (160) within the tower of the wind turbine. The cable guiding structure includes a horizontal movement element (300) at least partially movable in the width direction (112) of the tower (108). The horizontal movement element (300) includes a receiving part (301) for receiving the at least one cable (160) of the wind turbine and wherein the horizontal movement element allows a movement of the at least one cable (160) in the width direction (112) of the tower (100). Further, a method for mounting a cable guiding structure is described.

11 Claims, 7 Drawing Sheets

(56) References Cited

U.S. PATENT DOCUMENTS

| | | | |
|---|---|---|---|
| 9,051,920 B2* | 6/2015 | Prebio | F03D 80/00 |
| 9,982,659 B1* | 5/2018 | Leonard | F03D 13/20 |
| 10,018,189 B1 | 7/2018 | tenThoren | |
| 10,047,725 B2* | 8/2018 | Yenser | F03D 80/80 |
| 10,047,727 B2* | 8/2018 | Röer | F03D 80/88 |
| 10,336,578 B2* | 7/2019 | Legua | B66B 5/284 |
| 10,385,831 B2* | 8/2019 | Maryniok | H02G 3/30 |
| 10,914,095 B2* | 2/2021 | Reed | F03D 80/88 |
| 11,215,162 B2* | 1/2022 | Rubner | F03D 13/10 |
| 11,371,489 B2* | 6/2022 | Eidam | F03D 13/20 |
| 11,460,007 B2* | 10/2022 | Sosnenko | F03D 80/85 |
| 11,651,869 B2* | 5/2023 | Rouleau | F16L 3/18 248/70 |
| 2009/0206610 A1 | 8/2009 | Martin et al. | |
| 2009/0284012 A1 | 11/2009 | Mortensen | |
| 2012/0006578 A1 | 1/2012 | Schubert | |
| 2012/0133144 A1* | 5/2012 | Barton | H02G 11/00 290/55 |
| 2012/0199378 A1 | 8/2012 | Lu et al. | |
| 2013/0068496 A1 | 3/2013 | Domesle et al. | |
| 2013/0105199 A1 | 5/2013 | Domesle et al. | |
| 2014/0286778 A1* | 9/2014 | Moestrup | F03D 80/85 416/205 |
| 2015/0260166 A1* | 9/2015 | Olesen | F03D 13/20 290/55 |
| 2017/0097110 A1 | 4/2017 | Hamsho et al. | |
| 2021/0156365 A1 | 5/2021 | Eidam et al. | |
| 2023/0265836 A1* | 8/2023 | Gosain | F03D 13/20 174/99 R |

FOREIGN PATENT DOCUMENTS

| | | | | |
|---|---|---|---|---|
| CN | 112436462 A | * | 3/2021 | H02G 3/0406 |
| WO | WO2016/206690 A1 | | 12/2016 | |

* cited by examiner

CABLE GUIDING STRUCTURE FOR A TOWER FOR A WIND TURBINE, METHOD FOR MOUNTING A CABLE GUIDING STRUCTURE, AND WIND TURBINE

FIELD

The present subject matter generally relates to cable guiding structures for wind turbines, and more particularly to an arrangement of a nacelle of the wind turbine on a tower, wherein cables are provided from the nacelle on top of the tower to a lower part of the tower. The present subject matter further relates to a method for mounting a cable guiding structure in a tower of a wind turbine and a wind turbine having a cable guiding structure.

BACKGROUND

Wind power is considered one of the cleanest, most environmentally friendly energy sources presently available, and wind turbines have gained increased attention in this regard. A modem wind turbine possibly includes a tower, a generator, a gearbox, a nacelle, and one or more rotor blades.

Cables in a wind turbine are routed from the nacelle (where e.g. the transformer may be placed) through the tower to the exit of the tower of the wind turbine. During operation of a wind turbine, the nacelle on top of the tower of a wind turbine may be rotated leading to a twisting of the cables within the tower of the wind turbine. To compensate the occurring cable torsion as well as cable length differences, a cable loop is used.

It is an object to provide a cable guiding structure for a tower for a wind turbine including cables being guided from the nacelle to a lower portion of the tower, wherein disadvantages of the prior art, for example increased wear and/or large space requirements and/or complex cable loop arrangements are avoided or an effect thereof is reduced.

BRIEF DESCRIPTION

Aspects and advantages of the disclosure will be set forth in part in the following description, or may be obvious from the description, or may be learned through practice of the disclosure.

In one aspect, the present disclosure is directed to a cable guiding structure for a tower of a wind turbine, and to a method for mounting a cable guiding structure. Specific embodiments are described herein.

According to embodiments described herein, a cable guiding structure for a tower of a wind turbine is described. The tower of the wind turbine has a height in substantially vertical direction and a width in substantially horizontal direction being substantially perpendicular to the vertical direction. The cable guiding structure is adapted for guiding at least one cable within the tower of the wind turbine. The cable guiding structure includes a horizontal movement element being at least partially movable in the width direction of the tower. The horizontal movement element includes a receiving part for receiving the at least one cable of the wind turbine and wherein the horizontal movement element allows a movement of the at least one cable in the width direction of the tower.

According to embodiments described herein, a wind turbine is described including a cable guiding structure according to embodiments described herein.

Typically, the cable guiding structure according to embodiments described herein allows for compensating cable torsion and cable length differences. Cable torsion and length differences of the cable may be the result of movements of the wind turbine, such as rotations of the nacelle, or other changing conditions (e.g. weather induced movements of the tower of the wind turbine, or increasing and decreasing cable length due to environmental conditions, such as changing temperatures of the cable during operation, typically in a temperature range from −40° C. to +90° C.). In particular, the cable guiding structure reduces or even avoids cable abrasion and cable wear. Furthermore, the cable guiding structure according to embodiments described herein saves spaces within the tower of the wind turbine. Saving space within the tower of a wind turbine enables suitably using the space in the tower of the wind turbine, such as providing lifts, winches and the like. On the other hand, due to the space saving structure of the cable guiding structure according to embodiments described herein, a smaller section diameter of the tower of the wind turbine may be realized. Furthermore, a proper cable bending radius can be offered for the cable while being guided through the tower of the wind turbine, avoiding cable damage.

According to an embodiment, a method for mounting a cable guiding structure for guiding at least one cable within a tower of a wind turbine is described. The tower having a height in substantially vertical direction and a width in substantially horizontal direction being substantially perpendicular to the vertical direction. The method includes providing the at least one cable in a receiving part of a horizontal movement element being at least partially movable in the width direction of the tower and allowing the at least one cable to move in the width direction of the tower.

Typically, the method for mounting a cable guiding structure according to embodiments described herein improves the safety of the professional personnel, especially while mounting the cable and guiding the cable from the nacelle to the base of the tower of the wind turbine through the tower. Additionally, the method for mounting the cable guiding structure as described herein reduces the installation time and costs.

These and other features, aspects and advantages of the present disclosure will be further supported and described with reference to the following description and appended claims, in particular in paragraphs referring to FIG. 3 to FIG. 18. The accompanying drawings, which are incorporated in and constitute a part of this specification, illustrate embodiments of the disclosure and, together with the description, serve to explain the principles of the disclosure, wherein a limitation of the disclosure may not be construed by said shown embodiments.

BRIEF DESCRIPTION OF THE DRAWINGS

A full and enabling disclosure, including the best mode thereof, directed to one of ordinary skill in the art, is set forth in the specification, which makes reference to the appended figures, in which.

Single features depicted in the figures are shown relatively with regards to each other and therefore are not necessarily to scale. Similar or same elements in the figures, even if displayed in different embodiments, are represented with the same reference numbers

DETAILED DESCRIPTION

Reference now will be made in detail to embodiments of the disclosure, one or more examples of which are illustrated in the drawings. Each example is provided by way of explanation of the disclosure, not limitation of the disclosure.

According to some embodiments, a cable guiding structure may be understood as a structure for guiding one or more cables, or a bundle of cables, through the tower of a wind turbine. In the following, it is just referred to the term "cable" for the sake of conciseness, but the term includes one or more cables or a bundle of cables. Typically, the cable guiding structure may be provided for influencing the cable in the tower, such as the cable position and the cable movement within the tower of the wind turbine.

It may be understood that a cable guiding structure may include the horizontal movement element or may substantially consist of the horizontal movement element in some embodiments in the following description. For instance, the cable guiding structure may only include the horizontal movement element, or may have additional elements in an embodiment.

It shall be noted, that any indication with regard to positioning, specific locations and/or arrangements of the wind turbine, of the tower and/or of parts of the tower shall be understood with respect to an erected and/or operational wind turbine and its tower.

Furthermore, specific directions and orientations such as longitudinal, axial, radial, circumferential, inner and/or outer refer to the geometric structure of the tower. For example, the longitudinal axis or centerline of the tower has a more inner position than tower walls which have an outer position when seen in a radial direction.

Figure 1:
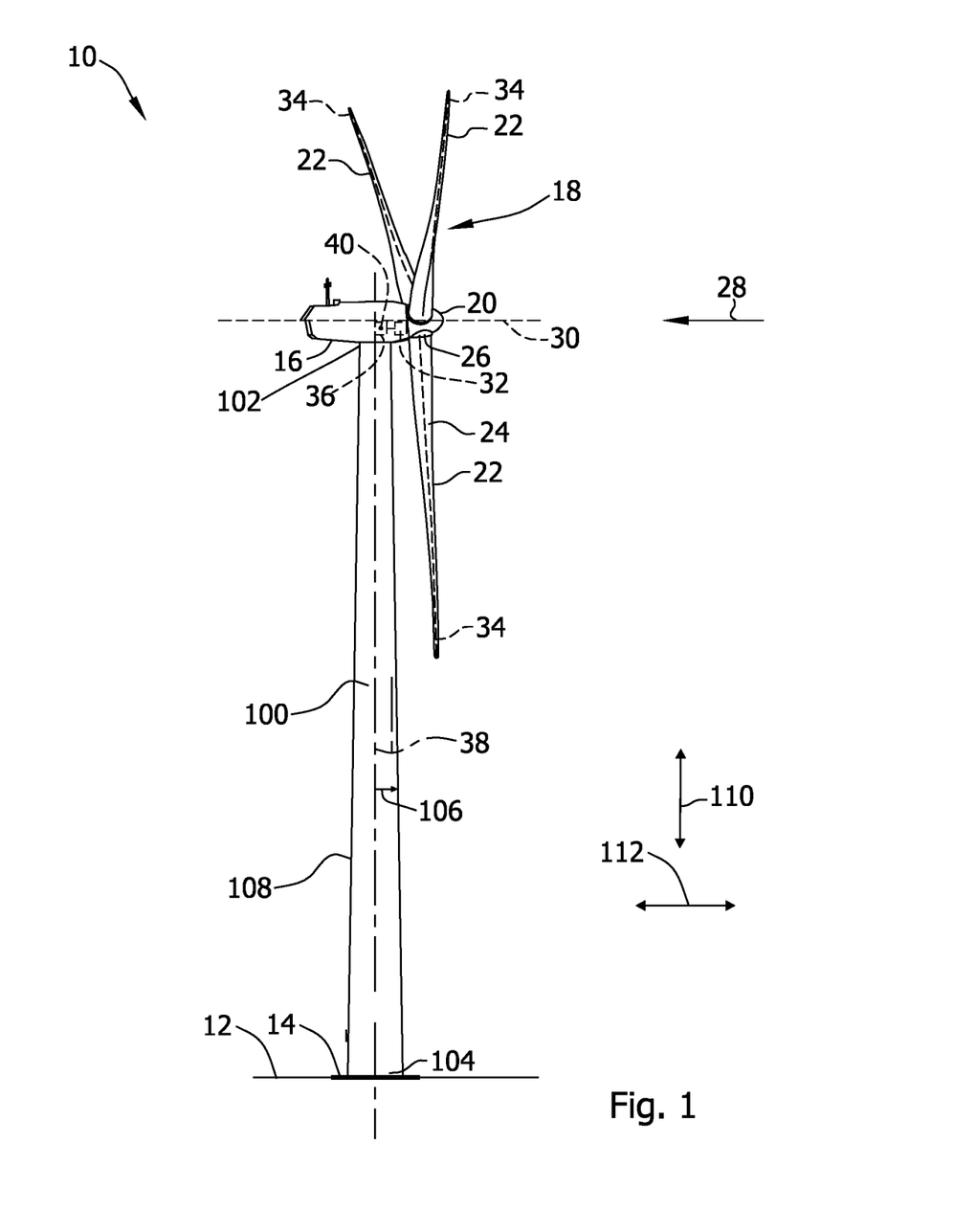
FIG. 1 illustrates a perspective view of one embodiment of a wind turbine according to the present disclosure.

FIG. 1 is a perspective view of an exemplary wind turbine 10. In the exemplary embodiment, the wind turbine 10 is a horizontal-axis wind turbine. Alternatively, the wind turbine 10 may be a vertical-axis wind turbine. In the exemplary embodiment, the wind turbine 10 includes a tower 100 that extends from a support system 14 on a ground 12, a nacelle 16 mounted on tower 100, and a rotor 18 that is coupled to nacelle 16. The rotor 18 includes a rotatable hub 20 and at least one rotor blade 22 coupled to and extending outward from the hub 20. In the exemplary embodiment, the rotor 18 has three rotor blades 22. In an alternative embodiment, the rotor 18 includes more or less than three rotor blades 22. In the exemplary embodiment, the tower 100 is fabricated from tubular steel to define a cavity (not shown in FIG. 1) between a support system 14 and the nacelle 16. In an alternative embodiment, the tower 100 is any suitable type of a tower having any suitable height. According to an alternative or additional embodiment, the tower can be a hybrid tower comprising a portion made of concrete and a tubular steel portion. Also, the tower can be a partial or full lattice tower.

The rotor blades 22 are spaced about the hub 20 to facilitate rotating the rotor 18 to enable kinetic energy to be transferred from the wind into usable mechanical energy, and subsequently, electrical energy. The rotor blades 22 are mated to the hub 20 by coupling a blade root portion 24 to the hub 20 at a plurality of load transfer regions 26. The load transfer regions 26 may have a hub load transfer region and a blade load transfer region (both not shown in FIG. 1). Loads induced to the rotor blades 22 are transferred to the hub 20 via the load transfer regions 26.

In one embodiment, the rotor blades 22 have a length ranging from about 15 meters (m) to about 91 m. Alternatively, rotor blades 22 may have any suitable length that enables the wind turbine 10 to function as described herein. For example, other non-limiting examples of blade lengths include 20 m or less, 37 m, 48.7 m, 50.2 m, 52.2 m or a length that is greater than 91 m. As wind strikes the rotor blades 22 from a wind direction 28, the rotor 18 is rotated about a rotor axis 30. As the rotor blades 22 are rotated and subjected to centrifugal forces, the rotor blades 22 are also subjected to various forces and moments. As such, the rotor blades 22 may deflect and/or rotate from a neutral, or non-deflected, position to a deflected position.

Moreover, a pitch angle of the rotor blades 22, i.e., an angle that determines a perspective of the rotor blades 22 with respect to the wind direction, may be changed by a pitch system 32 to control the load and power generated by the wind turbine 10 by adjusting an angular position of at least one rotor blade 22 relative to wind vectors. Pitch axes 34 of rotor blades 22 are shown. During operation of the wind turbine 10, the pitch system 32 may change a pitch angle of the rotor blades 22 such that the rotor blades 22 are moved to a feathered position, such that the perspective of at least one rotor blade 22 relative to wind vectors provides a minimal surface area of the rotor blade 22 to be oriented towards the wind vectors, which facilitates reducing a rotational speed and/or facilitates a stall of the rotor 18.

In the exemplary embodiment, a blade pitch of each rotor blade 22 is controlled individually by a wind turbine controller 36 or by a pitch control system 80. Alternatively, the blade pitch for all rotor blades 22 may be controlled simultaneously by said control systems.

Further, in the exemplary embodiment, as the wind direction 28 changes, a yaw direction of the nacelle 16 may be rotated about a yaw axis 38 to position the rotor blades 22 with respect to wind direction 28.

In the exemplary embodiment, the wind turbine controller 36 is shown as being centralized within the nacelle 16; however, the wind turbine controller 36 may be a distributed system throughout the wind turbine 10, on the support system 14, within a wind farm, and/or at a remote control center. The wind turbine controller 36 includes a processor 40 configured to perform the methods and/or steps described herein. Further, many of the other components described herein include a processor. As used herein, the term "processor" is not limited to integrated circuits referred to in the art as a computer, but broadly refers to a controller, a microcontroller, a microcomputer, a programmable logic controller (PLC), an application specific integrated circuit, and other programmable circuits, and these terms are used interchangeably herein. It should be understood that a processor and/or a control system can also include memory, input channels, and/or output channels.

Figure 2:
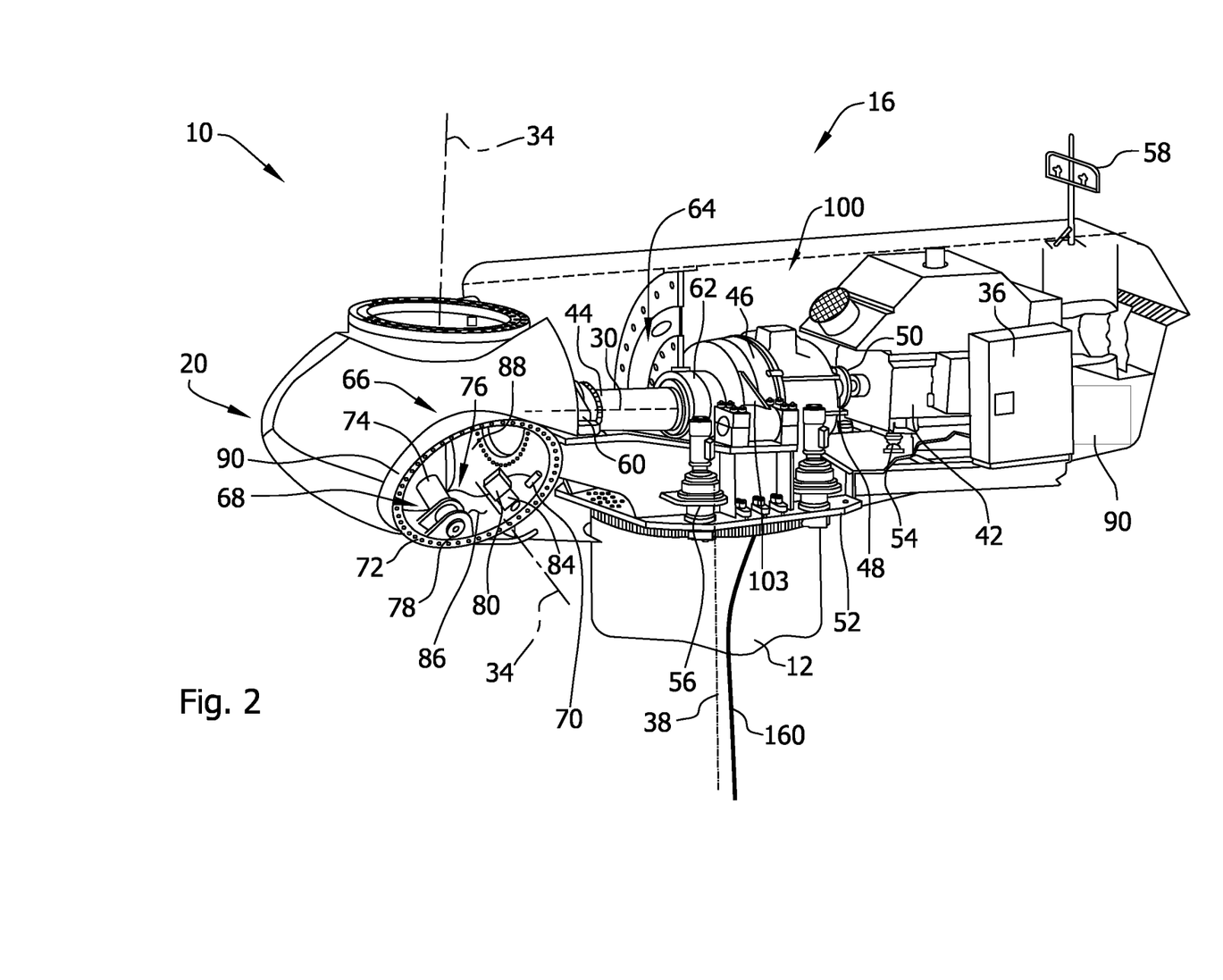
FIG. 2 illustrates a simplified, internal view of one embodiment of a nacelle of a wind turbine having a gearbox system according to the present disclosure.

FIG. 2 is an enlarged sectional view of a portion of the wind turbine 10. In the exemplary embodiment, the wind turbine 10 includes the nacelle 16 and the rotor 18 that is rotatably coupled to the nacelle 16. More specifically, the hub 20 of the rotor 18 is rotatably coupled to an electric generator 42 positioned within the nacelle 16 by the main shaft 44, a gearbox 46, a high speed shaft 48, and a coupling 50. In the exemplary embodiment, the main shaft 44 is disposed at least partially coaxial to a longitudinal axis (not shown) of the nacelle 16. A rotation of the main shaft 44 drives the gearbox 46 that subsequently drives the high speed shaft 48 by translating the relatively slow rotational movement of the rotor 18 and of the main shaft 44 into a relatively fast rotational movement of the high speed shaft 48. The latter is connected to the generator 42 for generating electrical energy with the help of a coupling 50. Furthermore, a transformer 90 and/or a suitable electronics, switches, and/or inverters are arranged in the nacelle 16 in order to transform electrical energy generated by the generator 42 having a voltage between 400V to 1000 V into electrical energy having medium voltage (10-35 KV). Said electrical energy is conducted via power cables 160 from the nacelle 16 into the tower 100.

The gearbox 46, generator 42 in transformer 90 may be supported by a main support structure frame of the nacelle 16, optionally embodied as a main frame 52. The gearbox 46 may include a gearbox housing that is connected to the main frame 52 by one or more torque arms 103. In the exemplary embodiment, the nacelle 16 also includes a main forward support bearing 60 and a main aft support bearing 62. Furthermore, the generator 42 can be mounted to the main frame 52 by decoupling support means 54, in particular in order to prevent vibrations of the generator 42 to be introduced into the main frame 52 and thereby causing a noise emission source.

Preferably, the main frame 52 is configured to carry the entire load caused by the weight of the rotor 18 and components of the nacelle 16 and by the wind and rotational loads, and furthermore, to introduce these loads into the tower 100 of the wind turbine 10. The rotor shaft 44, generator 42, gearbox 46, high speed shaft 48, coupling 50, and any associated fastening, support, and/or securing device including, but not limited to, support 52, and forward support bearing 60 and aft support bearing 62, are sometimes referred to as a drive train 64.

The nacelle 16 also may include a yaw drive mechanism 56 that may be used to rotate the nacelle 16 and thereby also the rotor 18 about the yaw axis 38 to control the perspective of the rotor blades 22 with respect to the wind direction 28.

For positioning the nacelle 16 appropriately with respect to the wind direction 28, the nacelle 16 may also include at least one meteorological mast 58 that may include a wind vane and anemometer (neither shown in FIG. 2). The mast 58 provides information to the wind turbine controller 36 that may include wind direction 28 and/or wind speed.

In the exemplary embodiment, the pitch system 32 is at least partially arranged as a pitch assembly 66 in the hub 20. The pitch assembly 66 includes one or more pitch drive systems 68 and at least one sensor 70. Each pitch drive system 68 is coupled to a respective rotor blade 22 (shown in FIG. 1) for modulating the pitch angel of a rotor blade 22 along the pitch axis 34. Only one of three pitch drive systems 68 is shown in FIG. 2.

In the exemplary embodiment, the pitch assembly 66 includes at least one pitch bearing 72 coupled to hub 20 and to a respective rotor blade 22 (shown in FIG. 1) for rotating the respective rotor blade 22 about the pitch axis 34. The pitch drive system 68 includes a pitch drive motor 74, a pitch drive gearbox 76, and a pitch drive pinion 78. The pitch drive motor 74 is coupled to the pitch drive gearbox 76 such that the pitch drive motor 74 imparts mechanical force to the pitch drive gearbox 76. The pitch drive gearbox 76 is coupled to the pitch drive pinion 78 such that the pitch drive pinion 78 is rotated by the pitch drive gearbox 76. The pitch bearing 72 is coupled to pitch drive pinion 78 such that the rotation of the pitch drive pinion 78 causes a rotation of the pitch bearing 72.

Pitch drive system 68 is coupled to the wind turbine controller 36 for adjusting the pitch angle of a rotor blade 22 upon receipt of one or more signals from the wind turbine controller 36. In the exemplary embodiment, the pitch drive motor 74 is any suitable motor driven by electrical power and/or a hydraulic system that enables pitch assembly 66 to function as described herein. Alternatively, the pitch assembly 66 may include any suitable structure, configuration, arrangement, and/or components such as, but not limited to, hydraulic cylinders, springs, and/or servo-mechanisms. In certain embodiments, the pitch drive motor 74 is driven by energy extracted from a rotational inertia of hub 20 and/or a stored energy source (not shown) that supplies energy to components of the wind turbine 10.

The pitch assembly 66 also includes one or more pitch control systems 80 for controlling the pitch drive system 68 according to control signals from the wind turbine controller 36, in case of specific prioritized situations and/or during rotor 18 overspeed. In the exemplary embodiment, the pitch assembly 66 includes at least one pitch control system 80 communicatively coupled to a respective pitch drive system 68 for controlling pitch drive system 68 independently from the wind turbine controller 36. In the exemplary embodiment, the pitch control system 80 is coupled to the pitch drive system 68 and to a sensor 70. During normal operation of the wind turbine 10, the wind turbine controller 36 controls the pitch drive system 68 to adjust a pitch angle of rotor blades 22.

In one embodiment, in particular when the rotor 18 operates at rotor overspeed, the pitch control system 80 overrides the wind turbine controller 36, such that the wind turbine controller 36 no longer controls the pitch control system 80 and the pitch drive system 68. Thus, the pitch control system 80 is able to make the pitch drive system 68 to move the rotor blade 22 to a feathered position for reducing a rotational speed of the rotor 18.

According to an embodiment, a power generator 84, for example comprising a battery, electric capacitors hence letter or an electrical generator driven by the rotation of the hub 20, is arranged at or within the hub 20 and is coupled to the sensor 70, the pitch control system 80, and to the pitch drive system 68 to provide a source of power to these components. In the exemplary embodiment, the power generator 84 provides a continuing source of power to the pitch assembly 66 during operation of the wind turbine 10. In an alternative embodiment, power generator 84 provides power to the pitch assembly 66 only during an electrical power loss event of the wind turbine 10. The electrical power loss event may include power grid loss or dip, malfunctioning of an electrical system of the wind turbine 10, and/or failure of the wind turbine controller 36. During the electrical power loss event, the power generator 84 operates to provide electrical power to the pitch assembly 66 such that pitch assembly 66 can operate during the electrical power loss event.

In the exemplary embodiment, the pitch drive system 68, the sensor 70, the pitch control system 80, cables, and the power generator 84 are each positioned in a cavity 86 defined by an inner surface 88 of hub 20. In an alternative embodiment, said components are positioned with respect to an outer surface of hub 20 and may be coupled, directly or indirectly, to outer surface.

As can be seen in FIGS. 1 and 2, the tower 100 has a top end 102 suitable for supporting the nacelle 16. Electrical energy generated by the generator 42 and transformed by the transformer 90 is conducted via the power cables 160 from the nacelle 16 in the tower 100, wherein a nacelle connection portion of the power cables 160 may firmly be arranged in the nacelle 16.

The power cables 160 are leading towards the yaw axis 38 and/or to a cable axis 162 mainly being aligned with a longitudinal axis 110 of the tower 100. At this central location, the power cables 160 are led into the tower 100. From there the power cables 160 are freely hanging into the tower 100 in axial direction, unless the power cables are guided by a structure, such as a cable guiding structure.

Typically, a wind turbine, and especially the tower and the nacelle are exposed to several influences causing the wind turbine to move (either intentionally or unintentionally). For instance, the nacelle may move due to the adaption of the yaw angle, or, as another example, the tower may be subjected to wind fluctuations and may move within an acceptable range. In still another example, the components of the wind turbine, such as cables, may be subjected to temperature fluctuations. For these examples (but also for several similar situations), the different components have to be adapted to tolerate the fluctuations without any loss in function.

In some examples, the cables may be twisted due to the movement of the nacelle during wind tracking. As an example, during operation including rotation of the nacelle around the yaw axis, cables may experience a twisting, which is acceptable at least in a certain range. In particular, a maximum twist angle may at least be +/−720° degrees (two entire rotations), preferably at least +/−900° degrees (three entire rotations), or at least +/−1440° (four rotations). Hence, the cables reaching from the nacelle to the electrical connection arrangement at the base of the wind turbine 10 are arranged, guided and configured to withstand such range of twisting without being subject to unwanted wear, structural damage and/or any further functional disadvantage caused by the twisting.

In particular, the cables may be configured to withstand a twist of at least 0.18 full rotations per meter cable length (n/m), in particular at least 0.2 n/m, preferred at least 0.25 n/m, and/or around 0.28 n/m, and/or not more than 0.4 n/m, in particular not more than 0.35 n/m, preferred not more than 0.3 n/m.

A cable loop is used in known systems to compensate the occurring cable torsion, as well as the changing cable length. Common cable loops promote cable abrasion due to touching cables. Due to twisting and touching cables while nacelle turning, the cables will be damaged over the time. Especially at the lowest point, loop cable abrasion damages the cable jacket. Also, cable loops occupy a lot of space to ensure proper bending radius. The reduced space due to the cable loop in the tower reduces the space within the tower for other components (e.g. lifts, winch and the like) in the tower section, where the loop is installed (e.g. the top section). Furthermore, the creation of the loop is very time consuming and challenging for the field technicians which leads to high costs, especially if the cables are installed in the standing tower in one piece.

According to embodiments described herein, a cable guiding structure is described for guiding the cable through the tower of the wind turbine. The cable guiding structure according to embodiments described herein includes a horizontal movement element, which allows the cable, which runs in a vertical direction through the tower, moving in the width or horizontal direction.

It may be understood that the substantially vertical direction may refer to the vertical direction and may include a deviation from the strict vertical direction of typically up to 15°. In some embodiments, the longitudinal axis 110 of the tower as described above and exemplarily shown in FIG. 1 may substantially run in vertical direction. Typically, the height of the tower of the wind turbine as described herein may be measured (or runs along) the substantially vertical direction or the longitudinal axis 110 of the tower 100.

It may be understood that the substantially horizontal direction may refer to the horizontal direction and may include a deviation from the strict horizontal direction of typically up to 15°. In some embodiments, the radial axis 112 of the tower as described above and exemplarily shown in FIG. 1 may substantially run in horizontal direction. Typically, the width of the tower of the wind turbine as described herein may be measured (or runs along) the substantially horizontal axis or the radial direction 112 of the tower 100.

According to some embodiments, a horizontal movement or a movement in width direction as referred to in embodiments herein may be understood as a guided movement. For instance, a horizontal movement or a movement in width direction may be understood as a movement being allowed and guided by a structure or an element according to embodiments described herein, such as a cable guiding structure or a horizontal movement element. In some embodiments, a horizontal movement or a movement in width direction may be described as a volitional movement, or an intended movement in the described direction. In particular, the horizontal movement or a movement in width direction may be induced by changing operational parameters of the wind turbine (such as yaw angle, changing temperature conditions of the cable, or the like) and may be allowed or guided by the cable guiding structure according to embodiments described herein. Typically, the horizontal movement of the cable or the movement of the cable in width direction may be a linear movement, such as a movement along a substantially straight line. In some embodiment, the horizontal movement of the cable or the movement of the cable in width direction may be a non-linear movement, such as an arcuate movement, a movement along a curved line, or the like (especially in embodiments having a lever arm, as described in detail below, the movement may be non-linear). Especially, a non-linear movement may include motions along a curve lying in a substantially horizontal plane and/or a substantially vertical plane. In some embodiments, the horizontal movement of the cable or the movement of the cable in width direction may include a mixture of linear and non-linear movement parts. Typically, the horizontal movement of the cable or the movement of the cable in width direction according to embodiments described herein may be a substantially continuous motion or a non-continuous motion having acceleration and deceleration parts.

Examples and details of a cable guiding structure according to embodiments described herein having a horizontal movement element are shown and described in the following in FIGS. 3 to 8. A tower of a wind turbine including the cable guiding structure according to embodiments described herein is described with respect to FIGS. 9 to 16. FIGS. 13 to 16 additionally show the cable running through the tower of the wind turbine.

According to some embodiments described herein, a horizontal movement element as used herein may be understood as an element, which may at least partially be movable in horizontal direction. Being at least partially movable may mean that a part of the horizontal movement element may be movable in horizontal direction. Typically, a horizontal movement element may allow and/or guide a movement of the cable mounted in (or to) the horizontal movement element, especially in horizontal direction. In some embodiments, the horizontal movement element may be able and adapted for guiding, balancing, changing or even redirecting a movement of the cable (e.g. in substantially vertical direction) at least partially in a movement in substantially horizontal direction (especially at the height of the cable guiding structure in the tower). For instance, an arc of cable being formed by the cable guiding structure within the tower of the wind turbine according to embodiments described herein may be used by the horizontal movement element for balancing a mere vertical movement of the cable.

Figure 3:
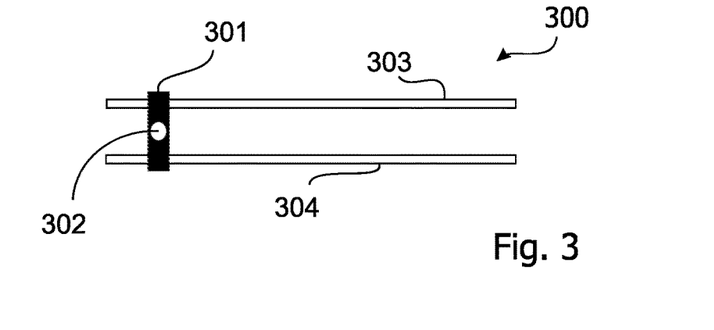
FIGS. 3 to 5 represent schematic top views of horizontal movement elements of a cable guiding structure according to embodiments described herein.

FIG. 3 shows a horizontal movement element 300 for a cable guiding structure according to embodiments described herein. The horizontal movement element 300 includes a receiving part 301 for receiving the cable of the wind turbine. The receiving part 301 may include an opening 302 for the cable(s) of the wind turbine 10.

In some embodiments, the receiving part 301 as described herein may be a cable fixation device fixing a cable running through the tower. According to some embodiments, the receiving part 301 as described herein may be a cable fixation device fixing the cable in one or more direction (e.g. limiting one or more degrees of freedom of the cable running through the tower). For instance, the receiving part may consist of or may include a cable clamp clamping the cable(s) of the wind turbine running through the tower of the wind turbine. According to some embodiments, the receiving part 301 may be a fixing clamp fixing the cable(s) at the position of the receiving part 301 (e.g. the height and width position of the receiving part 301). In some embodiments, the receiving part 301 may be an anti-torsional clamp allowing a movement of the cable(s) substantially in the vertical direction.

In FIG. 3, the horizontal movement element 300 includes a stationary element being exemplarily shown as a first rail 303 and a second rails 304, and a moving part being the receiving part 301. For instance, the receiving part 301 is movable (e.g. slidable) mounted to the stationary part (such as the first rail 303 and the second rail 304).

Figures 4, 5:
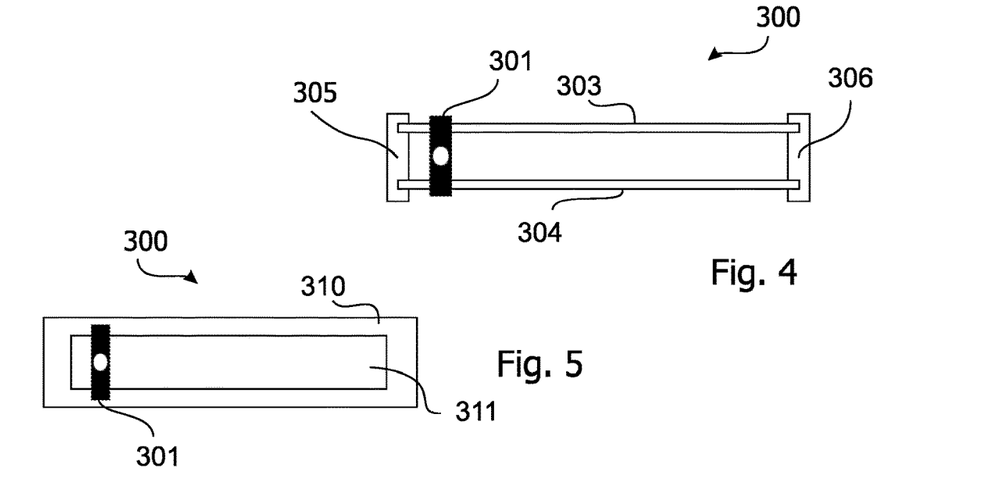

FIG. 4 shows an example of the horizontal movement element 300 according to embodiments described herein. The horizontal movement element 300 includes a receiving part 301 receiving the cable(s), a stationary part (including e.g. a first rail 303 and a second rail 304), and a first mounting support 305 and a second mounting support 306 for the first rail 303 and the second rail 304.

FIG. 5 shows an embodiment of a horizontal movement element 300 as described herein. Typically, the horizontal movement element 300 includes a stationary element being formed as a plate or a beam 310 in the example of FIG. 5. The beam 310 especially has a slot hole 311. The horizontal movement element 300 includes a moving part being the receiving part 301 in the embodiment of FIG. 5. Typically, the receiving part 301 is able to move along (such as slide along) the slot hole 311 of the beam 310. Typically, the receiving part 301 lies on the frame of the beam 310 while the cable(s) received by the receiving part 301 can pass through the slot hole 311.

The receiving part shown in the above figures is shown and described as being the moving part of the horizontal movement element. According to some embodiments, which may be combined with other embodiments described herein, the receiving part may be designed as not being the moving part, but being mounted to a moving part, e.g. to a kind of sled, carriage, sliding device, skid, or the like.

Figure 6:
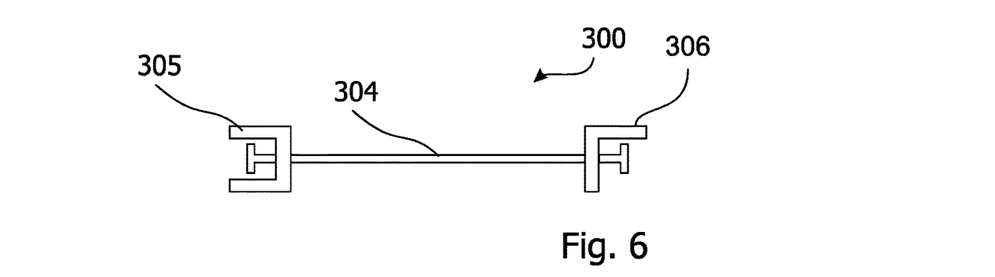
FIG. 6 shows a schematic side view of a horizontal movement element of a cable guiding structure according to embodiments described herein.

FIG. 6 shows an example of a horizontal movement element 300 in a side view according to embodiments described herein. The horizontal movement element 300 of FIG. 6 may for instance be a horizontal movement element 300 as shown in FIG. 4. In the side view of FIG. 6, the first mounting support 305 and the second mounting support 306 can be seen. Further, FIG. 6 shows an embodiment of a rail 303 being part of the stationary part of the horizontal movement element 300. In the embodiment shown in FIG. 6, the side view of the first mounting support 305 shows an exemplary profile having e.g. a substantial U-like shape. The profile of the second mounting support 306 may be the same as the profile of the first mounting support 305, or may be (as exemplarily shown in FIG. 6) have a different profile, e.g. a substantial L-shape. Other profile shapes and properties of the mounting supports may be chosen, such as quadrangular, rectangular, (partially) round, polygonal, hollow, massive, or the like, as suitable.

In the example of FIG. 6, the second rail 304 is shown in the side view. At both ends, the rails of the stationary part of the horizontal movement element are formed so as to provide a safety function. Typically, the safety function prevents the rails to fall out of the mounting supports, especially during operation of the wind turbine 10. For instance, the ends of the rails according to embodiments described herein may have a special shape, e.g. a thickened end, or an additional top part or the like. According to some embodiments, the ends of the rails of the horizontal movement element may include ends having a disc-like shape, as for instance shown in FIG. 6. In some embodiments, the ends of the rails may have a ball-like shape, a ring-like shape, a cube like shape or any other shape suitable for a safety function. According to some embodiments, the rails of the horizontal movement element may have a safety function only at one end of the rail. According to some embodiments, only one of the rails of the horizontal movement element may have a safety function at one or two end(s) of the rail.

Figure 7:
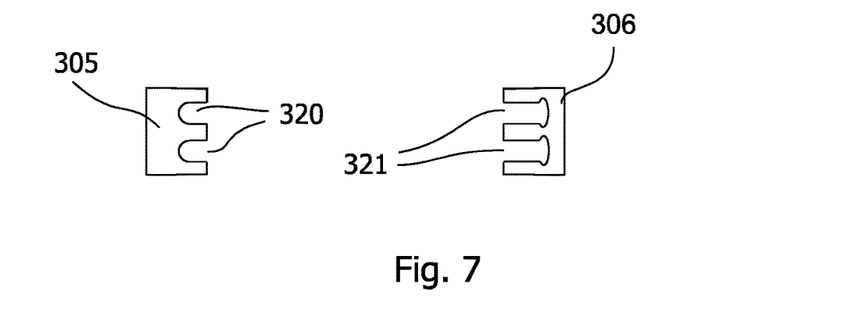
FIG. 7 shows a schematic top view of mounting supports of a horizontal movement element of a cable guiding structure according to embodiments described herein.

FIG. 7 shows an embodiment of mounting supports 305 and 306 of the horizontal movement element 300 as described herein in a top view. The mounting supports as shown in FIG. 7 may for instance be used in the embodiments shown in FIG. 4 and FIG. 6, but are not limited to the embodiments of FIG. 4 and FIG. 6. The first mounting support 305 and the second mounting support 306, especially when combined with a rail as exemplarily described in FIG. 6, may provide a self-locking mechanism 320, 321 according to embodiments described herein. For instance, the first mounting support 305 may include two recesses 320 for the rails. The second mounting support 306 may include two recesses 321 for the rails. The recesses 320, 321 may form part of a self-locking mechanism. According to some embodiments, the shape of the recesses may be chosen (especially with other parameters of the horizontal movement element, such as length, size, and shape) to prevent the rails from falling out of the mounting support, in particular for rails having an especially shaped end, as described above with respect to FIG. 6. For instance, the recesses 320 of the first mounting may be designed so that the rails may be put into place with a movement in longitudinal direction of the rail. The recesses 321 of the second mounting support 306 may, for instance, be designed so that the rails can be put in place with a movement in radial direction of the rail, as exemplarily shown in FIG. 7. In the embodiment shown in FIG. 7, the recesses 321 may have a mushroom-head like shape. According to some embodiments, the shape of the rails and the shape of the recesses of the mounting supports are adapted to each other and, in particular chosen accordingly.

Figure 8:
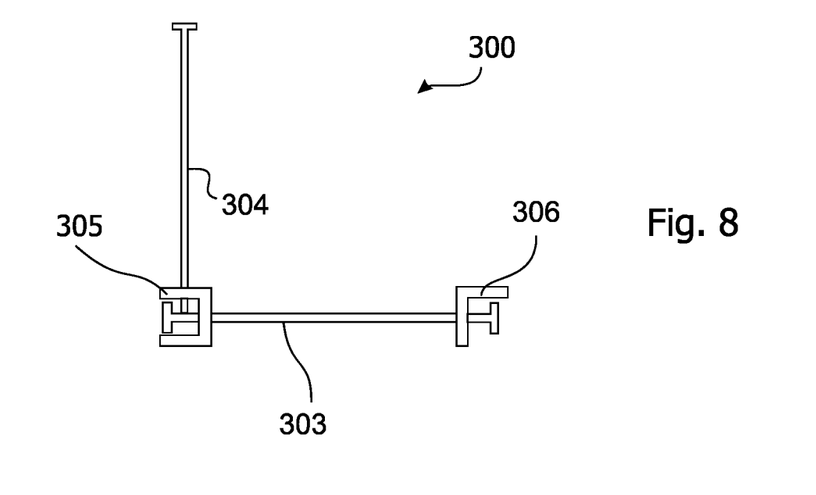
FIG. 8 shows a schematic side view of a horizontal movement element of a cable guiding structure in a mounting state according to embodiments described herein.

FIG. 8 shows a schematic side view of a horizontal movement element 300 in a mounting stage according to embodiments described herein. In the embodiment of FIG. 8, the first rail 303 is mounted to the first mounting support 305 and the second mounting support 306. For placing the cable (especially with the receiving part 301 of the horizontal movement element 300) between the first rail 303 and the second rail 304, typically, the second rail 304 is taken out of one of the mounting supports, e.g. mounting support 306, as shown in FIG. 8. In particular, the first mounting support 305 and the second mounting support 306 may be adapted (e.g. by size, shape, and/or design) to remove one of the rails out of the mounting support by a technician without any tools, e.g. by moving the rail in one defined direction, as exemplarily described with respect to FIG. 7.

As can be seen in the embodiment of FIG. 8, the second rail 304 is removed out of the mounting support 306, and typically locked in the removed state for mounting a cable of the wind turbine (especially a power cable 160). In particular, a self-locking mechanism (e.g. provided by the shape and geometry of the mounting support recessed and the shape and geometry of the corresponding rail) may make sure that the rail stays in the removed position, as exemplarily shown in FIG. 8. In the removed position of one of the rails, the cable (especially together with the receiving part) may be placed on or next to the first rail 303. After having placed the cable on or next to the first rail 303, the second rail 304 may be closed by placing it in the second mounting support 306. In this way, the cable is placed and runs between the first rail 304 and the second rail 305. With such a mounting mechanism, the montage time and the installation costs may be reduced.

As shown in the embodiments described above, the receiving part 301 as moving part of the horizontal movement element 300 is shown as a kind of sliding moving part. According to some embodiments, the moving part of the horizontal movement element 300 may be moved by any suitable moving mechanism, e.g. a sliding mechanism, a spring mechanism, a rail mechanism, a hydraulic mechanism, or the like.

Figure 9:
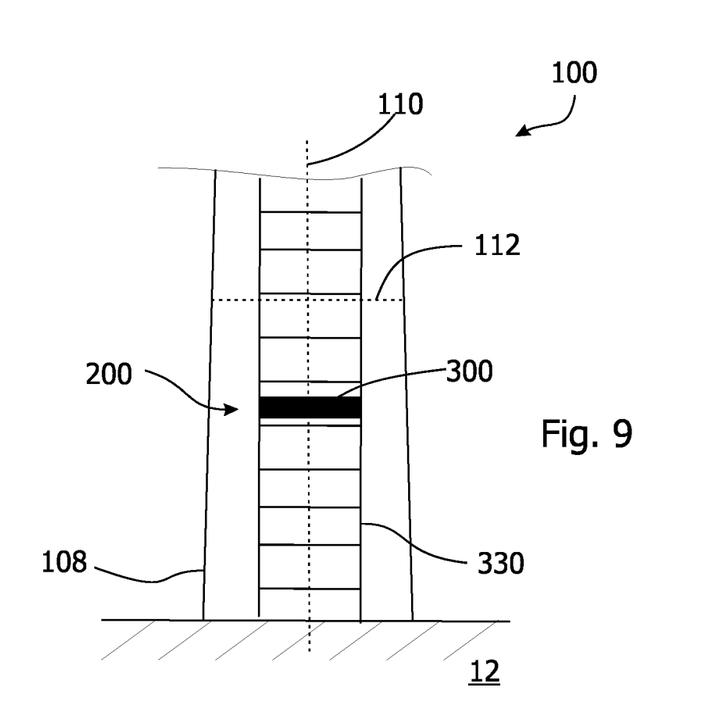
FIGS. 9 to 12 show schematic partial sectional views of towers of wind turbines having cable guiding structures according to embodiments described herein.

FIG. 9 shows a tower 100 of a wind turbine and tower walls 108 according to embodiments described herein. In particular, the tower 100 includes a cable guiding structure 200 having a horizontal movement element 300 according to embodiments described herein. In the embodiment shown in FIG. 9, the tower 100 includes a ladder structure 330. In some embodiments, the ladder structure 330 may be fixed to the tower 100 (or the tower walls 108), especially firmly fixed to the tower 100 (or the tower walls 108). Typically, the horizontal movement element 300 and/or the cable guiding structure 200 is/are mounted to the ladder structure 330 in the embodiment shown in FIG. 9. In an embodiment, in which the ladder structure is fixed to the tower 100 (or the tower walls 108), the cable guiding structure 200 and/or the horizontal movement element 300 are also fixed to the tower.

Figure 10:
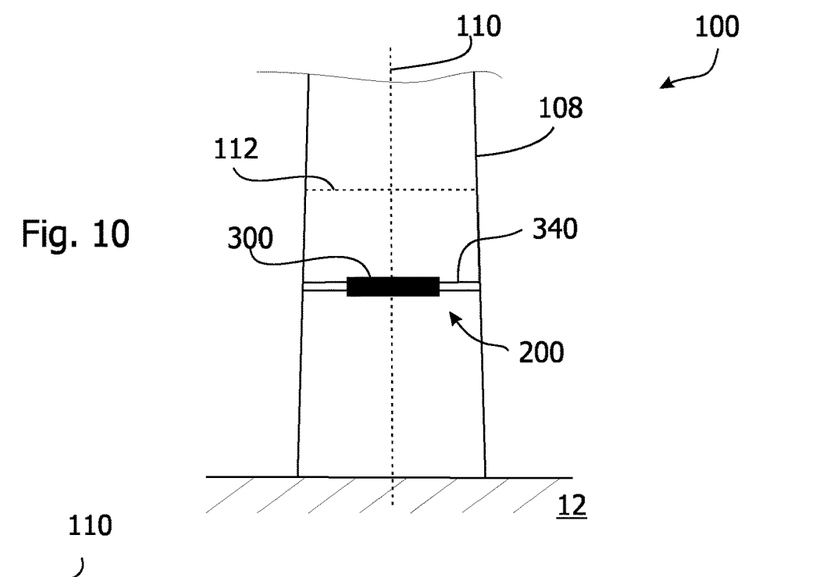

FIG. 10 shows a tower 100 of a wind turbine and tower walls 108 according to embodiments described herein. In particular, the tower 100 includes a cable guiding structure 200 having a horizontal movement element 300 according to embodiments described herein. In the embodiment shown in FIG. 10, a beam 340 is provided. Typically, the horizontal movement element 300 being part of the cable guiding structure 200 is mounted and/or fixed to the beam 340. In some embodiments, the beam may be fixed to the wall 108 of the tower 100 of the wind turbine.

Figure 11:
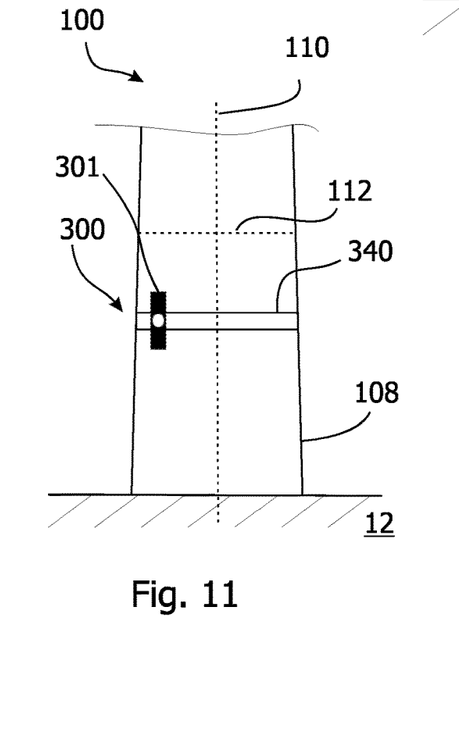

FIG. 11 shows an embodiment of a cable guiding structure 200 having a horizontal movement element 300 and a receiving part 301 for receiving the cable. A beam 340 is provided in the embodiment shown in FIG. 11, which may typically be fixed to the wall 108 of the tower 100 of the wind turbine 10. FIG. 11 shows the beam 340 being the stationary part of the horizontal movement element 300. In particular, the moving part of the horizontal movement element 300 including the receiving part 301 may be movable on the beam 340, in particular directly on the beam 340. For instance, the receiving part 301 may slide on the beam 340, especially for providing a horizontal movement of the cable running through the tower 100 of the wind turbine. According to some embodiments, the beam 340 of FIG. 11 may be a beam as exemplarily shown in FIG. 5.

Figure 12:
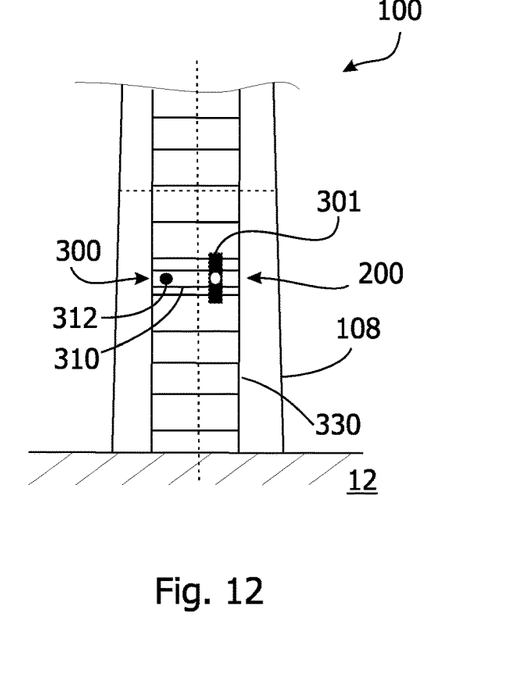

FIG. 12 shows an example of tower 100 with a cable guiding structure 200 having a horizontal movement element 300 according to embodiments described herein. The cable guiding structure 200 includes a ladder structure 330, which may typically be mounted and/or fixed to the tower 100, especially the wall 108 of the tower, in the embodiment shown in FIG. 12. The cable guiding structure 200 exemplarily shown in FIG. 12 has a lever arm 310. In particular, the lever arm 310 may have a fixed point 312. Typically, the lever arm 310 may be able to rotate around the fixed point 312, or may at least be able to move around the fixed point 312 in a defined range. For instance, the lever arm 310 may be able to rotate around the fixed point 312 for typically between about 5° and about 45°, more typically between about 5° and about 40°, and even more typically between about 10° and about 350.

In the embodiment shown in FIG. 12, the lever arm 310 is mounted and/or fixed to the ladder structure 330 of the cable guiding structure 200. In some embodiments, the lever arm 310 may be mounted and/or fixed (especially directly mounted and/or fixed) to the tower 100 of the wind turbine, especially to the wall 108 of the wind turbine. According to some embodiments, the lever arm 310 may be a horizontal movement element 300 as exemplarily shown in FIG. 5. For instance, the receiving part 301 may move within a slot hole 311 of the horizontal movement element 300. In particular, the receiving part 301 may move within a slot hole 311 of the horizontal movement element 300, when the lever arm 310 moves, especially around the fixed point 312. According to some embodiments, the receiving part 301 may move within a slot hole 311 of the horizontal movement element 300 along the longitudinal axis of the lever arm 310 (which may be understood as moving in substantially horizontal direction in embodiments described herein), when the lever arm 310 rotates around the fixed point 312.

Figures 13, 14, 15:
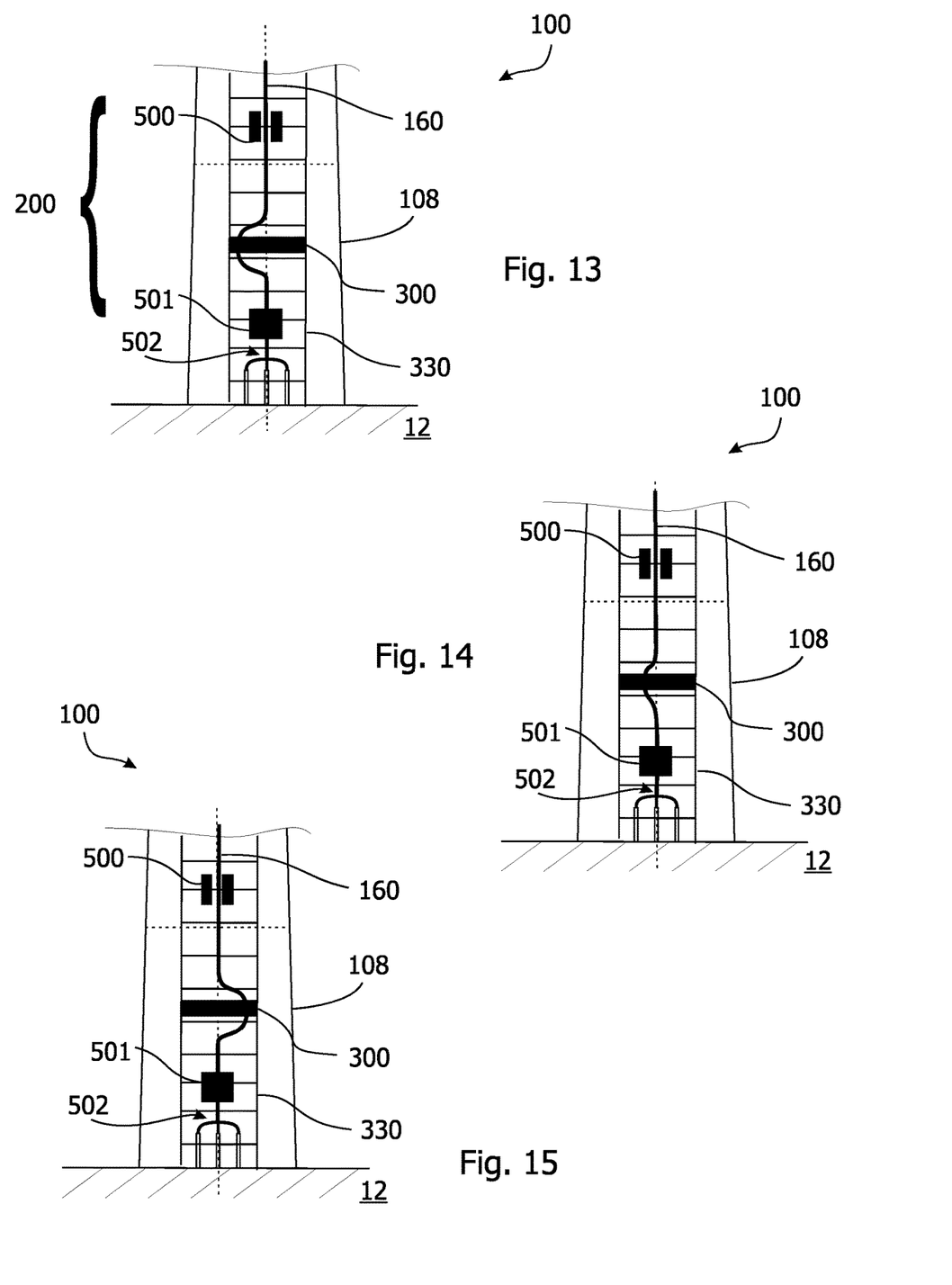
FIGS. 13 to 16 show schematic partial sectional views of towers of wind turbines having cable guiding structures and cables running through the towers according to embodiments described herein; and, FIGS. 17 to 18 show a schematic block diagram of a method for mounting a cable guiding structure according to embodiments described herein.

FIG. 13 shows an embodiment of a cable guiding structure 200 within a tower 100 of a wind turbine and a cable (typically the power cable 160) running through the tower 100.

Typically, the cables in the tower are hanging in an essentially straight and parallel manner, and are mainly directed in axial and/or longitudinal direction 110 of the tower 100, unless guided by a respective structure, such as the cable guiding structure according to embodiments described herein.

The cable guiding structure 200 includes an anti-torsional device 500 (especially an anti-torsional clamp) and a fixing clamp 501 (especially a fixing clamp) in the embodiment shown in FIG. 13. Typically, the cable torsion will be stopped at a certain point over the horizontal movement element 300 with the help of the installed anti-torsional device 500. More typically, the anti-torsional device 500 may be fixedly mounted to the tower 100, especially the wall 108 of the tower 100.

According to some embodiments, which may be combined with other embodiments described herein, the anti-torsional device or the anti-torsional clamp as described herein may be adapted so, that any twist introduced into the cables 160 by a rotation of the nacelle 16 cannot propagate beyond the anti-torsional device 500. Typically, an anti-torsional device as described herein may allow a movement of the cable (only) in the substantially vertical direction or substantially along the longitudinal direction of the cable.

As can be seen in FIG. 13, the anti-torsional device 500 typically is arranged above the horizontal movement element 300, when seen in the direction of an increasing height of the tower 100 beginning at the ground 12. Typically, the fixing device 501 is arranged below the horizontal movement element 300, when seen in a direction of increasing height of the tower 100 beginning at the ground 12.

In the embodiment shown in FIG. 13, the cable guiding structure 200 includes the anti-torsional device 500 and the fixing device 500. According to some embodiments, the anti-torsional device 500 may be omitted, e.g. in an embodiment, in which the anti-torsional device is provided as (part of) the receiving part of the horizontal movement element 300.

According to embodiments described herein, the cable guiding structure as described herein, and especially with respect to FIG. 13 allows to create a vertical torsion stopped compact cable guidance for electrical cables with help of a supporting structure. In some embodiments, and as described above, the supporting structure may include e.g. beams, anti-torsion cable clamp(s) or anti-torsional clamp plate(s), a horizontal movement element such as a sliding cable clamp plate as well as fixed cable clamp(s) or fixing device(s). Typically, the supporting structure may be fixed in a certain height of a ladder structure (e.g. with screws) or at the tower shell or wall (e.g. with bosses) and is accessible. The dimension of the cable guiding structure ensures proper cable bending radius, especially with help of pre-defined position(s) of the single components, such as the cable clamps. For instance, in FIG. 13, the cable 160 can be seen running in a substantially vertical direction through the tower in a first section and is then bent to an arc-like shape in a second section. In a third section, the cable again runs in a substantially vertical direction Typically, a bending radius in an arc of the cable according to embodiments described herein may be about 8× the cable outer diameter, more typically about 10× the cable outer diameter, and even more typically about 12× the cable outer diameter. In some embodiments, a cable bending radius may typically be between about 200 mm and about 600 mm, more typically be between about 250 mm and about 550 mm, and even more typically be between about 300 mm and about 500 mm. For instance, the cable bending radius may typically be about 400 mm in a wind turbine as described herein. According to some embodiments, the distance between top point and lowest point of the arc (especially in substantially vertical direction) may typically be between about 100 mm and about 400 mm, more typically between about 150 mm and about 300 mm, and even more typically between about 150 mm and about 250 mm. In some embodiments, the distance between top point and lowest point of the arc (especially in substantially vertical direction) may typically be about 200 mm in a wind turbine as described in embodiments described herein. It may be understood that the cable bending radius as well as the distance between top point and lowest point of the arc may deviate from the above values. Typically, the cable bending radius as well as the distance between top point and lowest point of the arc may depend on various parameters, such as the wind turbine, especially the kind of the wind turbine, the size of the wind turbine, the size of the cables, the kind of cables, the number of cables, and the like. Typically, the distance between top point and lowest point of the arc may depend on the cable bending radius.

According to some embodiments, the cable guiding structure 200 causes the cable 160 being bent in an arc in an unstressed situation. Typically, an unstressed situation may exemplarily be understood as a situation before operation start of the wind turbine (e.g. after the montage). The arc may substantially have the shape of a half-circle, or any part of a circle, or a part of an ellipse, or any other curve shape, which may result from bending a cable. Typically, the cable length differences (resulting especially from a movement of the nacelle, the tower or operational condition, such as heat) will be adjusted or balanced in the second section with the arc of the cable, typically with an up and down movement of the cables without cable touching and related abrasion. To ensure proper cable routing, the cable may be movable guided with the help of the horizontal movement element 300 according to embodiments described herein. As can be seen in FIG. 13, the cable may be fixed with a fixing device 501 (such as a fixing cable clamp) below the horizontal movement element 300 to ensure proper cable routing (and a suitable bending radius) for avoiding cable damage. Typically, a proper bending radius may depend on the cable size and diameter, the number of cables, the material of the cables, and the like.

According to some embodiments, the bent cable arc may be seen as a kind of cable store for being able to compensate cable length differences.

According to some embodiments, which may be combined with other embodiments described herein, the power cable may be guided to a cable splice point 502 below the horizontal movement element 300 when seen in a direction of increasing height of the tower 100 beginning at the ground 12. In particular, the fixing device 501 of the cable guiding structure 200 may fix the cable at the point of the fixing device 501 and avoid pressure on cable splice point 502.

Typically, the one or more cables 160 running through the tower 100 may be split up at the splice point 502. Typically, the electrical connection arrangement located in the tower or on a base of the tower includes a power cable splice point, such as splice point 502. The power cable splice point connects lower endings of the power cable(s) with subsequent power conducting devices. In particular, if the electrical connection arrangement is positioned in the tower, the power cables are connecting the nacelle to the electrical connection arrangement, wherein from the subsequent electrical connection to subsequent electric devices is achieved by using subsequent power conducting devices typically embodied as aluminum conductors.

FIG. 14 shows an embodiment, in which the receiving part of the horizontal movement element 300 is moved in direction of the longitudinal axis 110 (or towards the center) of the tower and away from the tower wall 108, especially when compared with the cable position shown in FIG. 13. In the embodiment shown in FIG. 14, the arc formed by the bent cable (especially the power cable 160) is smaller, or flatter than the arc of the bent cable shown in FIG. 13. In this way, a cable length difference can be compensated.

In FIG. 15, the receiving part of the horizontal movement element 300 of the cable guiding structure 200 is moved substantially in the horizontal direction so, that the cable (exemplarily shown the power cable 160) is bent in the other direction towards the tower wall 108, especially when compared to the embodiment of FIG. 13.

Figure 16:
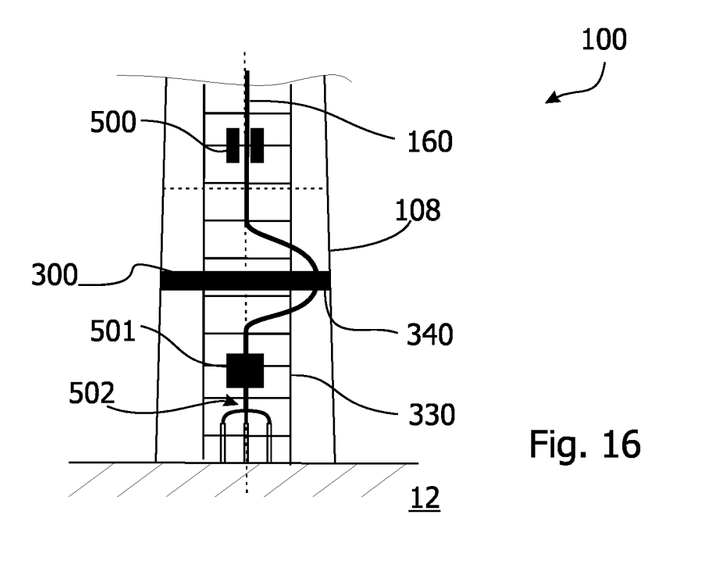

FIG. 16 shows an embodiment of a cable guiding structure similar to the cable guiding structure of FIG. 13. The embodiment of FIG. 16 includes a beam as the static element of the horizontal movement element 300, on or in which the receiving part 301 with the cable (only shown the power cable 160) may move. Typically, the beam 340 may be fixed to the ladder structure 330 or tower 100. In the embodiment of FIG. 16, the cable 160 is bent so as to reach outside the ladder structure 330 of the cable guiding structure. As described above, the (possible and suitable) bending radius of the cable may depend on the cable size, the cable diameter, the cable material and the like.

Typically, a power cable according to the present disclosure is a conducting device configured for transmitting one type of electrical current, in particular having a single phase. In particular, a multi-core cable having a plurality of power conductors configured for transmitting a plurality of electrical currents, in particular each having a different electrical phase, shall be considered as a plurality of power cables.

According to an embodiment, the power cable as referred to herein may also be a bundle of cables, such as a bundle including a number of power cables being at least three, preferably a multiplicity of three. It may be understood that a cable as referred to herein (especially a cable guided by the cable guiding structure according to embodiments described herein) may be a power cable (or a bundle of power cables), but is not limited to power cables. The term "cable" as referred to herein may also include other types of cables, such as control cables, especially control cables having a smaller cross-section than the power cables used in a wind turbine (see power cable sizes in the following). Typically, the control cables may have a cross section in the range of e.g. 5×1 mm$^2$, more typically 5×1.5 mm$^2$, and even more typically 7×1.5 mm$^2$. In some embodiments, control cables may be provided for emergency stop function, safety chain function and/or may be an optic cable (such as a fiber optic cable). Typically, the control cables are also routed from the nacelle to the exit of the turbine.

With respect to one or both of the aforementioned embodiments, at least one or a plurality of cables for transmitting communication signals and/or support and/or auxiliary energy can be provided additionally or alternatively to the above mentioned cables.

In some embodiments, a cable (MV$_{high}$-cable, 20-35 kV) for the higher middle voltage power transmission made of copper may have a cross section of at least 55 mm$^2$, preferably at least 60 mm$^2$, further preferred at least 65 mm$^2$, and/or of around 70 mm$^2$, and/or may have a cross section not larger than 75 mm$^2$, in particular preferably not larger than 80 mm$^2$.

A cable (MV$_{high}$-cable, 20-35 kV) for the higher middle voltage power transmission made of aluminum may have a cross section of at least 85 mm$^2$, preferably at least 90 mm$^2$, and/or of around 95 mm$^2$, and/or may have a cross section not larger than 110 mm$^2$, in particular not larger than 100 mm$^2$, preferably not larger than 95 mm$^2$.

A cable (MV$_{low}$-cable, ca. 10 kV) for the lower middle voltage power transmission made of copper may have a cross section of at least 150 mm$^2$, in particular at least 170 mm$^2$, preferably at least 180 mm$^2$, and/or of around 185 mm$^2$, and/or may have a cross section not larger than 230 mm$^2$, preferably not larger than 210 mm$^2$, further preferred not larger than 190 mm$^2$.

A cable (MV$_{low}$-cable, ca. 10 kV) for the lower middle voltage power transmission made of aluminum may have a cross section of at least 200 mm$^2$, in particular at least 220 mm$^2$, preferably at least 230 mm$^2$, and/or of around 240 mm$^2$, and/or may have a cross section not larger than 280 mm$^2$, preferably not larger than 260 mm$^2$, further preferred not larger than 250 mm$^2$.

According to an additional or alternative embodiment, electrical energy as generated by the generator having a voltage of 400 V to 1000 V is guided through the tower to an electrical power component, switches and/or to a transformer for being transformed to medium voltage (10-35 KV) by said components located at a lower position than the nacelle. In this case at least 9 cables, in at least particular 12, preferred 15 cables, and/or not more than 21 cables, in particular not more than 18 cables, preferred 15 cables are used for connecting the generator and/or power devices of the generator to a transformer being located in the tower below the generator or on the ground.

For example, a cable for such low voltage power transmission, in particular made from copper, may have a cross section of at least 200 mm$^2$, preferably at least 220 mm$^2$, further preferred at least 240 mm$^2$, and/or of around 270 mm$^2$, and/or may have a cross section not larger than 330 mm$^2$, preferably not larger than 310 mm$^2$, further preferred not larger than 300 mm$^2$.

Figure 17:
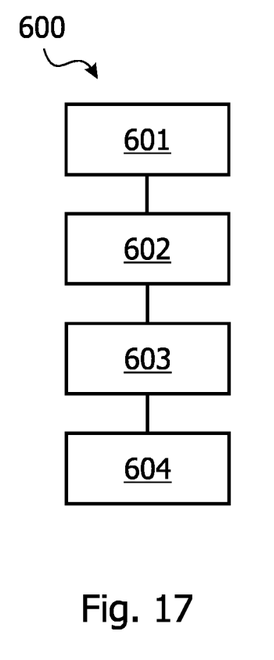

FIG. 17 shows a schematic flow chart of a method 600 for mounting a cable guiding structure according to embodiments described herein. In block 601, the method includes arranging a first part of the cable guiding structure. For instance, the first part may be a first rail, and may further include one or more mounting supports, such as mounting supports 305, 306 for the first rail 303. According to some embodiments, the first rail 303 and the mounting support(s) 305, 306 as referred to in the method described herein may be a first rail 303 and a mounting support as described in detail above. Arranging the first part as described in some embodiments herein may be understood in that the first part may be put in place, or may be mounted to a structure of the wind turbine tower and/or the cable guiding structure, such as a ladder, a mounting structure, a beam, or the like.

In block 602, the method 600 typically includes mounting the at least one cable in a receiving part 301 of a horizontal movement element 300. Typically, the horizontal movement element may be a horizontal movement element as described in embodiments above. According to some embodiments described herein, the receiving part may be a fixing device, such as a fixing clamp, or a anti-torsional device, such as an anti-torsional clamp. According to some embodiments, mounting the cable to the receiving part may include clamping the cable in a fixing device or an anti-torsional device. In some embodiments, the receiving part may be a moving part or may be mounted to a moving part of the horizontal movement element as described in some embodiments herein.

In block 603, the method 600 typically includes mounting the cable mounted in the receiving part to the arranged first part of the cable guiding structure. For instance, the cable in the receiving part (such as a clamp) may be put near to, close to, or adjacent to the first part of the cable guiding structure. In some embodiments, the cable may be put near to the first rail of the cable guiding structure. For instance, the receiving part may be in touch with the first part (being e.g. the first rail), when the cable in the receiving part is mounted to the arranged first part of the cable guiding structure.

In block 604, the method 600 includes closing the cable guiding structure, especially by arranging (and securing) a second part of the cable guiding structure. According to some embodiments, the cable guiding structure may be closed by arranging (and securing) a second part of the cable guiding structure to the first part. For instance, the second part may be put into one or more mounting support(s) 305, 306 of the cable guiding structure, as for instance described with respect to FIGS. 6 to 8.

Figure 18:
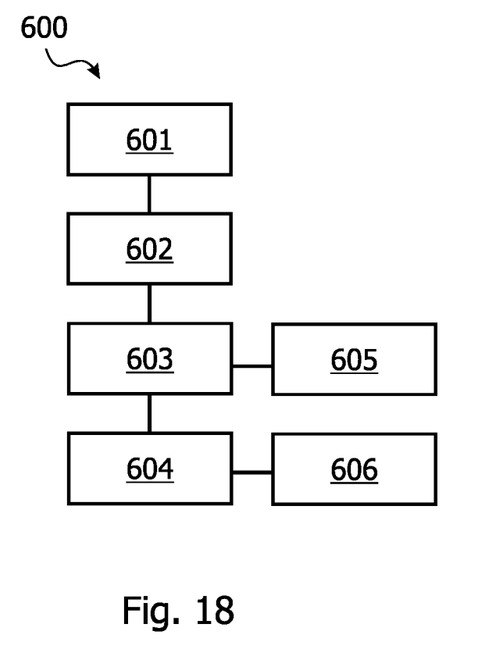

In FIG. 18, mounting the cable to the arranged first part of the cable guiding structure is specified in block 605 by mounting the cable near to, close to, or adjacent to the arranged first rail element of the cable guiding structure. Typically, the first rail may be mounted e.g. in a mounting support, or in another part of the cable guiding structure. Block 606 of FIG. 18 specifies arranging (and securing) a second part of the cable guiding structure of block 604 by arranging (and securing) the second rail element 304 of the cable guiding structure, so that the at least one cable is guided between the first rail element 303 and the second rail element 304. In some embodiments, the receiving part with the cable mounted to it may be placed on both the first rail and the second rail after arranging (and securing) the second part. According to some embodiments, the first rail and the second rail may be mounted and secured to and by the mounting supports as described in detail above.

According to some embodiments, the first part of the cable guiding structure as described in embodiments of a method herein may be a beam, especially a beam having a long-hole, as for instance shown in FIG. 5.

According to some embodiments, the method may include providing the at least one cable in a receiving part 301 of a horizontal movement element 300. Typically, the receiving part 301 may be a receiving part as described above and may include (or mainly consist of) a cable clamp, such as an anti-torsional cable clamp or a fixing cable clamp. According to embodiments described herein, the horizontal movement element may be at least partially movable in the width direction of the tower and allows the cable to move in the width direction of the tower, as e.g. shown in the embodiments of FIGS. 13 to 16. In particular, the components used in the method as described in embodiments herein, such as the horizontal movement element, the cable guiding structure, the clamps, the tower, the ladder structure, and so on, may be the components as described above in embodiments.

According to some embodiments described herein, the method may include a the horizontal movement element including a moving part providing a movement of the receiving part in width direction of the tower and a stationary element supporting the moving part. The method 600 typically includes mounting the receiving part to the moving part of the horizontal movement element.

Especially, the method according to embodiments described herein may include firstly mounting a first rail 303 of the horizontal movement element 300, as exemplarily shown in FIG. 8. Then, the receiving part 301 including the cable may be put in place, before the second rail 304 is mounted, e.g. closed. For instance, the first rail 303 and the second rail 304 may be mounted to a first mounting support 305 and a second mounting support 306. By firstly mounting the first rail 303, then putting the receiving part 301 into place, and then mounting or closing the second rail 304, the montage of the cable into the cable guiding structure 200 can be made in an easy way and spare installation costs.

According to some embodiments, the method may help to create a compact vertical cable arc with the help of a horizontal movement element according to embodiments described herein. Also, a proper cable bending radius may be ensured due to pre-defined positioning of cable devices, such as cable clamps. Furthermore, the cable torsion will be stopped at a certain point with help of an anti-torsion device, such as a snit-torsional cable clamp. The cable length differences will be adjusted in the arc only with up and down movement of the cables. Additionally, the cable arc will be positioned in a defined position to allow easy and safe cable loop creation as well using standard cable length for the cables from the transformer to the tower splice point.

According to embodiments described herein, it may be understood that embodiments described herein refer to the guidance of cables which are fixed at the nacelle or machine head (MH) structure (e.g. in a waterfall type) may be routed free hanging and guided (e.g. through cable guidance rings) in the tower until the cable guiding structure according to embodiments described herein, especially until the anti-torsional clamp of the cable guiding structure according to some embodiments. At the cable guiding structure (or the anti-torsional clamp of the cable guiding structure), the cables will be fixed to stop the torsion. After the torsion of the cables is stopped, the cables will be movable guided in a vertical arc (e.g. a half circle arc) with help of the cable guiding structure. Especially, the cables will be movable guided in a vertical arc by a sliding cable clamp plate as a horizontal movement element to ensure proper cable bending radius. Below the horizontal movement element being e.g. a sliding cable clamp, the cable may be fixed with additional elements of the horizontal movement element, such as additional cable clamps to ensure proper cable routing (and typically bending radius) and avoid pressure on cable splice point, as described above. In one embodiment, the cable length differences which occur during MH turns may typically be adjusted in the flexible part of the cable arc (e.g. a half circle arc) between the anti-torsion clamp and the fixed cable clamp with an up and down movement of the guided cable.

According to embodiments described herein, the cable guiding structure as described herein may safe space for other options (e.g. lift, winch, and the like), allow smaller section diameter compared to known solutions, ensure proper cable bending radius due to pre-defined position of cable fixation devices, such as clamps, eliminate cable abrasion due to touching cables in known cable loops, simplify the MV cable route creation in the field, improve on-the-job-safety, and reduce installation costs.

In fact, it will be apparent to those skilled in the art that various modifications and variations can be made in the present invention without departing from the scope or spirit of the invention, for instance, features illustrated or described as part of one embodiment can be used with another embodiment to yield a still further embodiment, for example, by combining the embodiments of FIGS. 3 to 8 showing details of the horizontal movement element with the embodiments of FIGS. 9 to 16 showing details of the position and mounting of the cable guiding structure within the tower. It is intended that the present invention covers such modifications and variations as come within the scope of the appended claims and their equivalents. Embodiments as described shall represent various aspects of the disclosure, wherein additional combinations of said embodiments are explicitly included as long as such combinations make technically stands in the light of the skilled person.

REFERENCE NUMBERS

- 10 wind turbine
- 12 Ground
- 14 support system
- 16 Nacelle
- 18 Rotor
- 20 rotatable hub
- 22 rotor blades
- 24 blade root portion
- 26 load transfer regions
- 28 wind direction
- 30 rotor axis
- 32 pitch system
- 34 pitch axes
- 36 wind turbine controller
- 38 yaw axis
- 40 Processor
- 42 electric generator
- 44 main shaft
- 46 Gearbox
- 48 high speed shaft
- 50 Coupling
- 52 main frame
- 54 decoupling support means
- 56 yaw drive mechanism
- 58 meteorological mast
- 60 forward support bearing
- 62 aft support bearing
- 64 drive train
- 66 pitch assembly
- 68 pitch drive system
- 70 sensor
- 72 pitch bearing
- 74 pitch drive motor
- 76 pitch drive gearbox
- 78 pitch drive pinion
- 80 pitch control system
- 84 power generator
- 86 Cavity
- 88 inner surface
- 90 Transformer
- 92 nacelle cable fixation means
- 100 Tower
- 102 top end
- 104 support end
- 106 tower radius
- 108 tower wall
- 110 axial direction
- 112 radial direction
- 160 power cable
- 200 Cable guiding structure
- 300 Horizontal movement element
- 301 Receiving part
- 302 Opening
- 303 First rail
- 304 Second rail
- 305 First mounting support
- 306 Second mounting support
- 310 Beam, lever arm
- 311 Hole
- 312 Fixed point
- 320 Recesses
- 321 Recesses
- 330 Ladder structure
- 340 Beam
- 500 Anti-torsional device
- 501 Fixing device
- 502 Splice point
- 600 Method
- 601-606 Method blocks

The invention claimed is:

1. A cable guiding structure adapted for guiding at least one cable within a tower of a wind turbine, wherein the tower has a height in a substantially vertical direction and a width in a substantially horizontal direction perpendicular to the vertical direction, the cable guiding structure comprising:
a horizontal movement element at least partially movable in the width direction of the tower, the horizontal movement element comprising a receiving part that receives the cable, the receiving part movable along a stationary supporting element;
the receiving part slidably mounted on the stationary element during operation of the wind turbine to allow movement of the cable in the width direction of the tower induced by changing operational parameters of the wind turbine.

2. The cable guiding structure according to claim 1, wherein the receiving part comprises a clamp device.

3. The cable guiding structure according to claim 2, wherein the receiving part comprises a sliding element and the stationary element comprises a rail element on which the sliding element slides in the width direction of the tower.

4. The cable guiding structure according to claim 3, wherein the rail element comprises a first rail mounted in a first mounting support and a second mounting support mounted in a second mounting support, wherein the second rail is removable from the second mounting support to mount the receiving to the first rail before mounting the second rail, wherein the second mounting support comprises a self-locking mechanism that prevents the second rail from falling out of the second mounting support during operation of the wind turbine.

5. The cable guiding structure according to claim 1, further comprising an anti-torsional clamp disposed above the horizontal movement element, wherein the anti-torsional clamp is configured to allow a vertical movement of the cable.

6. The cable guiding structure according to claim 1, further comprising a fixing clamp disposed below the horizontal movement element.

7. The cable guiding structure according to claim 1, wherein the horizontal movement element is fixable to the tower, and wherein the cable guiding structure comprises a ladder structure usable for fixing the horizontal movement element or a beam for mounting the horizontal movement element in the tower.

8. The cable guiding structure according to claim 1, wherein the horizontal movement element comprises a beam formed as a lever arm that is movable about a fixed point, the receiving part mounted on the leaver arm.

9. The cable guiding structure according to claim 8, wherein the lever arm comprises a hole in which the receiving part moves as the lever arm moves.

10. The cable guiding structure according to claim 1, wherein the cable guiding structure causes the cable to bend in an arc in an unstressed condition.

11. A tower of a wind turbine, comprising the cable guiding structure according to claim 1.

* * * * *